Figure 12:
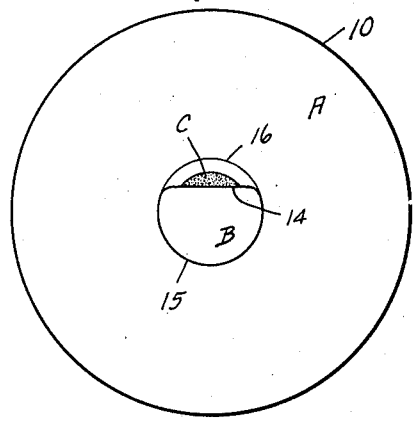

May 25, 1943.  F. E. DUCKWALL  2,319,922
APPARATUS AND METHOD FOR PRODUCING ONE-PIECE
MULTIFOCAL LENS BLANKS AND LENSES
Filed May 17, 1940  6 Sheets-Sheet 1
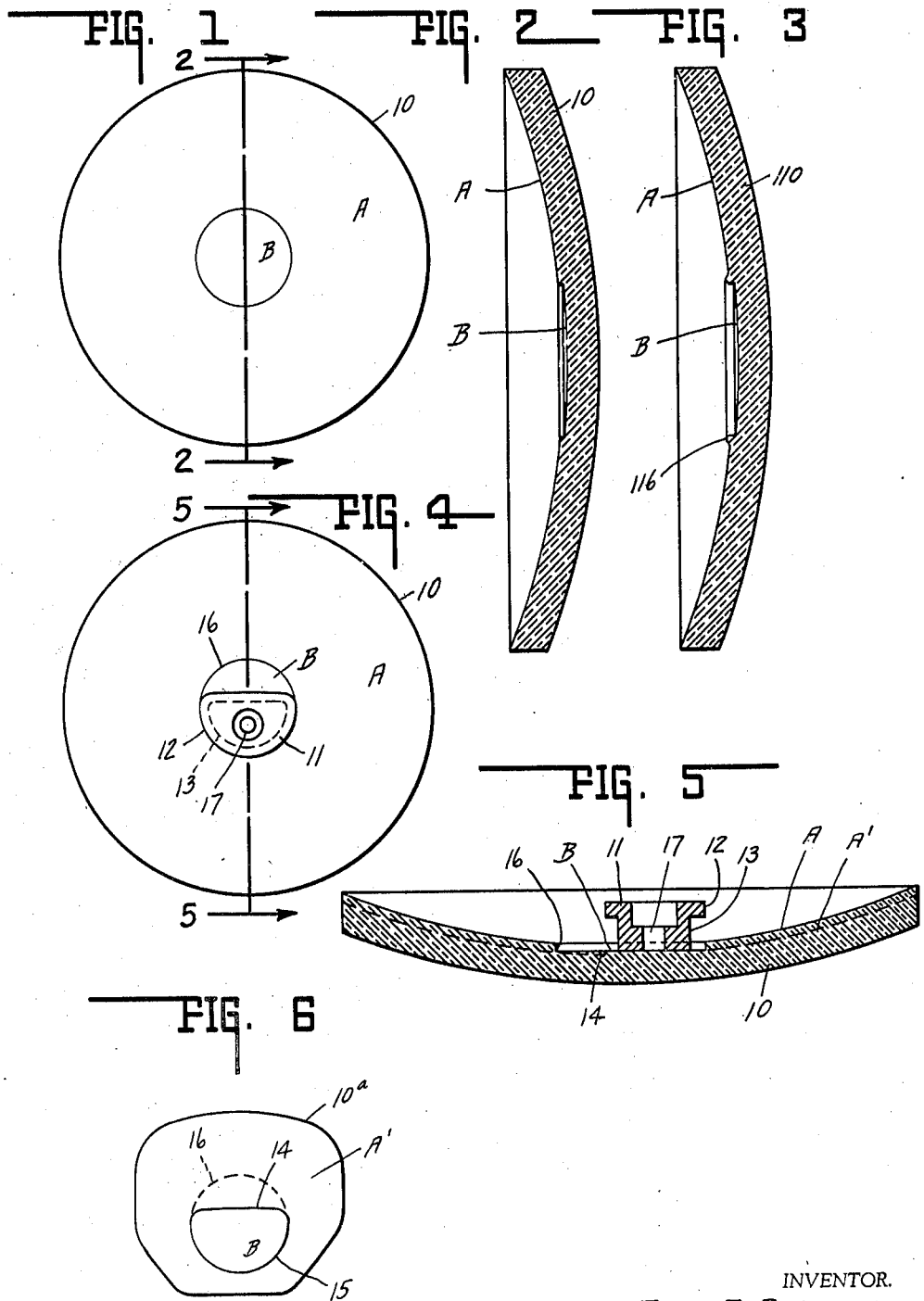
INVENTOR.
FRANK E. DUCKWALL.
BY Lockwood, Goldsmith & Galt,
ATTORNEYS.

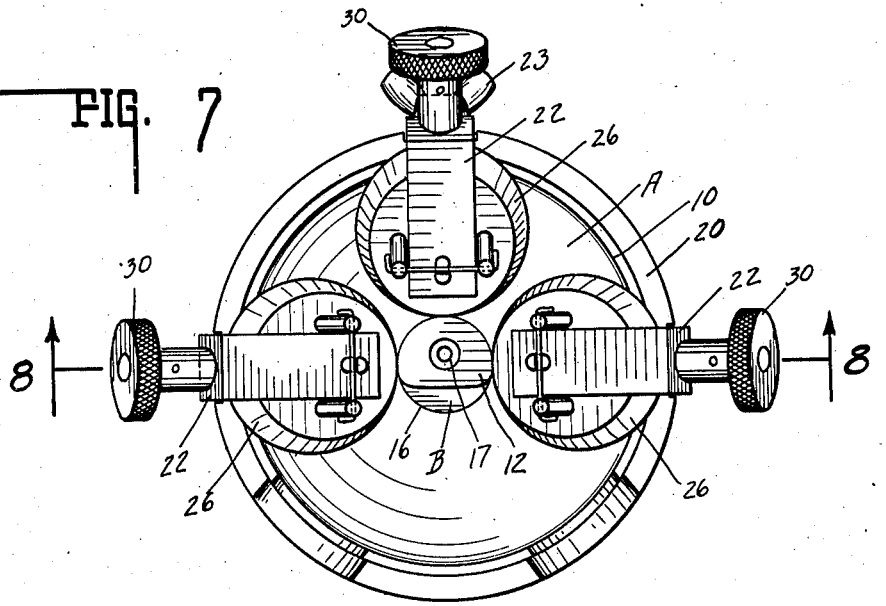
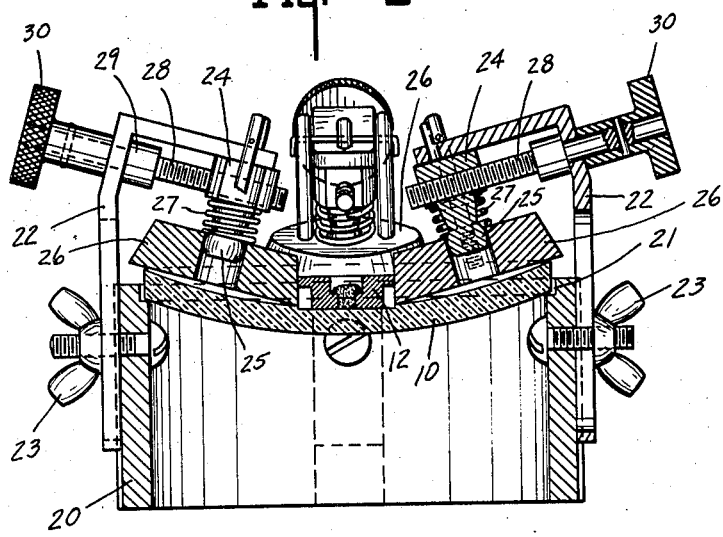

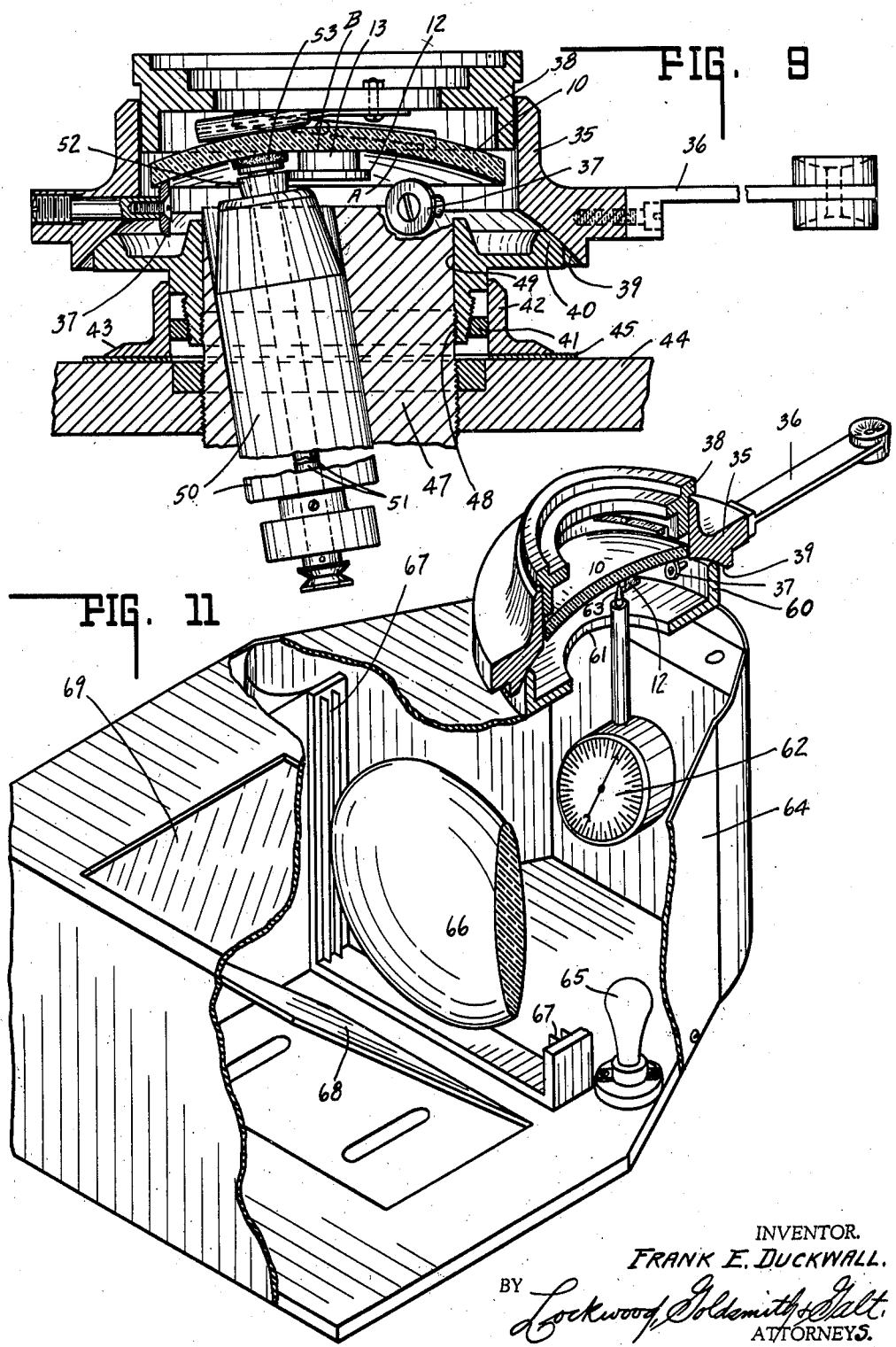

May 25, 1943.  F. E. DUCKWALL  2,319,922
APPARATUS AND METHOD FOR PRODUCING ONE-PIECE
MULTIFOCAL LENS BLANKS AND LENSES
Filed May 17, 1940  6 Sheets-Sheet 4
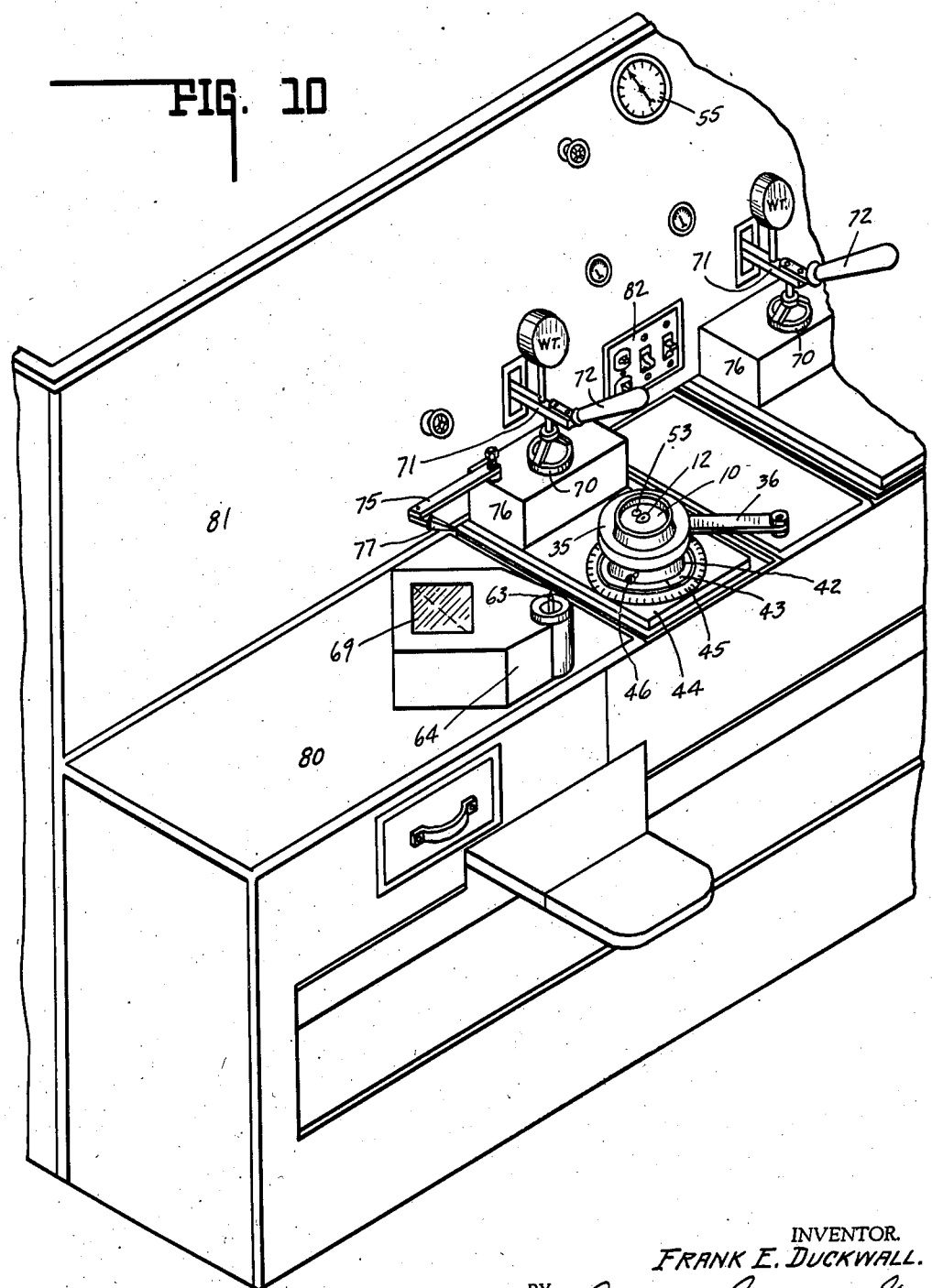
INVENTOR.
FRANK E. DUCKWALL.
BY Lockwood, Goldsmith & Galt
ATTORNEYS.

May 25, 1943.   F. E. DUCKWALL   2,319,922
APPARATUS AND METHOD FOR PRODUCING ONE-PIECE
MULTIFOCAL LENS BLANKS AND LENSES
Filed May 17, 1940   6 Sheets-Sheet 5

INVENTOR.
FRANK E. DUCKWALL.
BY Lockwood, Goldsmith & Galt
ATTORNEYS.

May 25, 1943.  F. E. DUCKWALL  2,319,922
APPARATUS AND METHOD FOR PRODUCING ONE-PIECE
MULTIFOCAL LENS BLANKS AND LENSES
Filed May 17, 1940   6 Sheets-Sheet 6
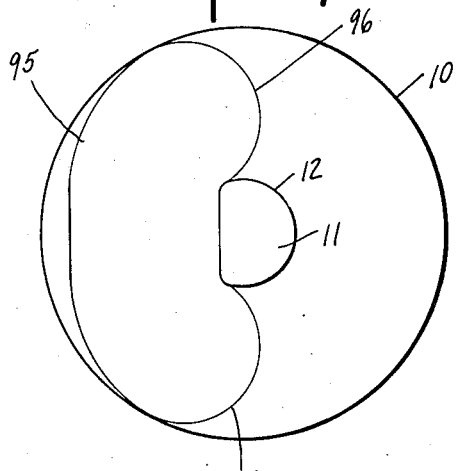
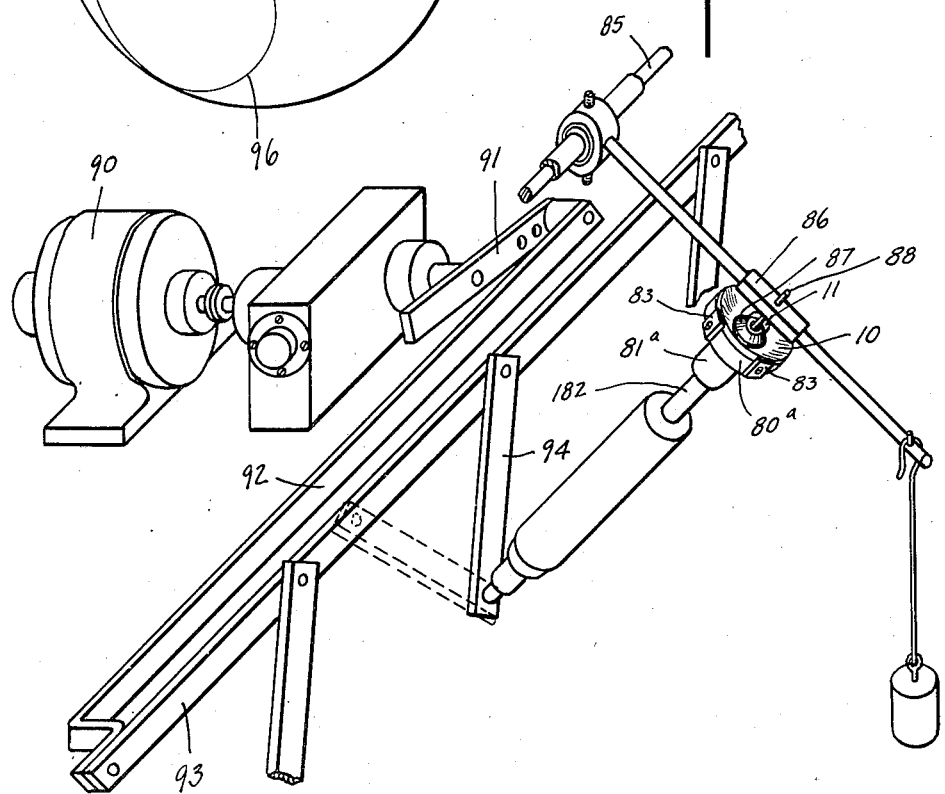
INVENTOR.
FRANK E. DUCKWALL.
BY Lockwood, Goldsmith & Galt
ATTORNEYS.

Patented May 25, 1943

2,319,922

UNITED STATES PATENT OFFICE 2,319,922

APPARATUS AND METHOD FOR PRODUCING ONE-PIECE MULTIFOCAL LENS BLANKS AND LENSES

Frank E. Duckwall, Indianapolis, Ind., assignor to Continental Optical Company, Inc., Indianapolis, Ind., a corporation Application May 17, 1940, Serial No. 335,810

9 Claims. (Cl. 51—284)

This invention relates to the method and apparatus for producing one-piece bifocal or trifocal lens blanks and lenses, and particularly that type of lens having a non-circular segment for providing the near vision field, and in some modifications, an intermediate vision field.

It has heretofore been proposed to grind the full blank with a provisional distance vision field and an inner circular near vision field in the usual manner for providing the well known "Ultex" one-piece bifocal lenses, and wherein the boundary line between the fields is circular. Thereupon, a portion of the circular near vision field is ground away to conform with the distance vision field so as to provide a non-circular boundary line between the two. For this purpose, a cam controlled grinding tool has been proposed, for example, a cam button secured over that portion of the near vision field which is to remain and not be ground away, as more specifically disclosed in the prior patents to Taylor No. 2,097,001, issued October 26, 1936; to Houchin No. 2,087,687, issued July 20, 1937; and to Hubbell No. 1,928,538, issued September 26, 1933.

In the actual commercial production of such lenses, it has been found that the use of a cam button secured to the lens for directly controlling and guiding the grinding and polishing buttons is the most practical and satisfactory means of producing such a lens, particularly as illustrated in Fig. 17 of the above-mentioned letters patent to Taylor. But in the use of such cam button, difficulty has been experienced in conforming the grinding and polishing action to the exact boundary line or demarcation between the two fields. This is for the reason that wherein the cam button lies on said line, it is impossible to carry the grinding operation sharply thereto, since a film of rouge and dust becomes interposed and embedded about the cam button, resulting in a minute depressed groove being produced which may be due to the wedging action of the cam and button.

It is the purpose of this invention to provide a more accurate method and apparatus for grinding and polishing the distance vision field, including removing a portion of the near vision field, to accurately meet the non-circular boundary line and effect a smooth merging surface between the two fields, eliminating any shoulder or surface aberration.

One feature of the invention resides in the provision of an undercut cam button having a raised tool engaging cam of the area and shape desired for the finished near vision field, and spaced from the surface thereof by a securing block spaced inwardly from its tool engaging surface.

Another feature of the invention resides in the method and apparatus for applying the grinding tool to the lens blank for engagement with and guidance by the cam, whereby the cutting operation of the grinding tool may be controlled to grind away the portion to be removed at predetermined depths for each cut.

Another feature of the invention resides in the method and apparatus for gauging the depth of each cut, and the variation in depth and surface curvature on each side of the boundary line to be removed during the grinding operation, whereby the extent of the operation may be accurately controlled without marring the outer field.

A further feature of the invention resides in the method and apparatus for polishing the distance vision or outer field and the ground portion of the near vision field to remove any trace of the original boundary line therebetween, and at the same time effect a smooth merger between the finished fields along the remaining circular portion of their boundary line.

Thus, as a result of the method and apparatus herein disclosed, a multifocal one-piece lens may be commercially produced with complete elimination of the ground away portion of the original boundary line, and a smooth merger of the fields along the remaining circular portion of their boundary line.

A modification of the invention resides in the method and apparatus for first polishing and finishing the outer field adjacent the ground away portion of the inner field so as to indistinguishably merge therewith, and then further polishing and finishing the outer field to smoothly merge with the inner field along the remaining circular portion of their dividing boundary line.

The problem overcome by this modification results from the difficulty of so polishing and finishing the outer field as to both effect a smooth merger with the ground away portion of the inner field, while at the same time causing said polishing and finishing operation to bring the remaining portion of the outer field into smooth merging relation with the inner field along the circular portion of their boundary line. Difficulty has been experienced in balancing these two operations, since there is danger of polishing away so much of the outer field in effecting the merger with the ground away portion that the remaining portion thereof about the circular portion of the boundary line may be too far depressed and leave an undesirable shoulder.

Figure 13:
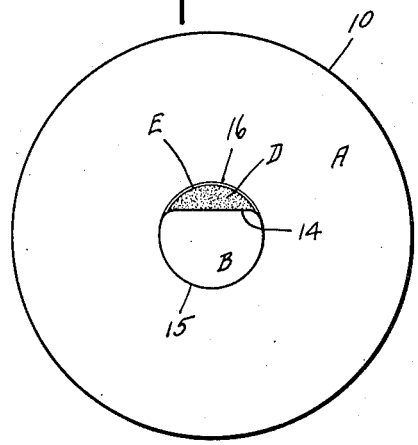
Figure 14:
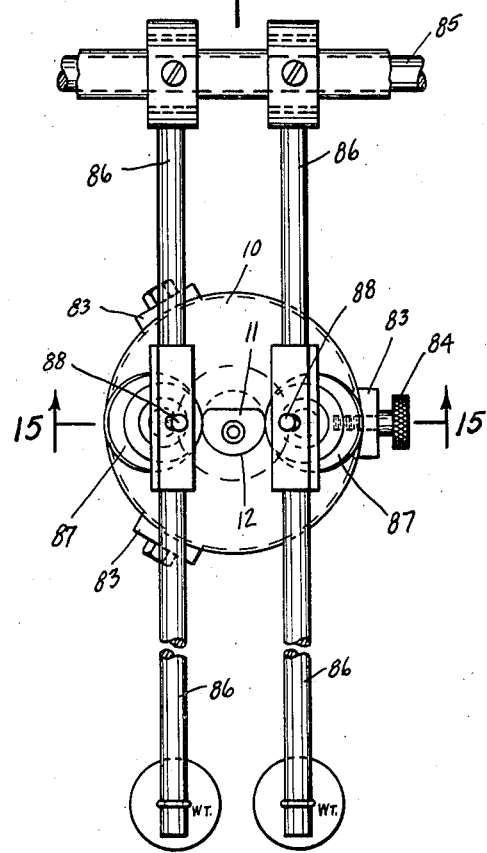
Figure 15:
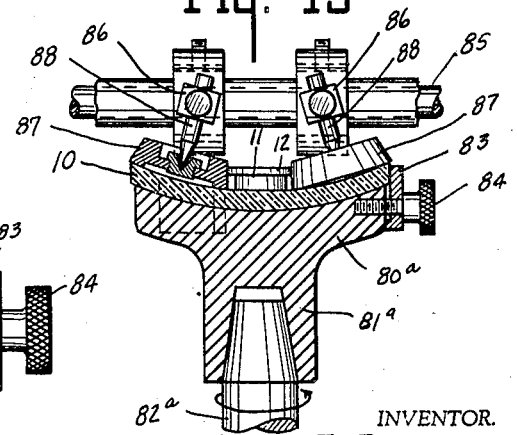
Figure 16:
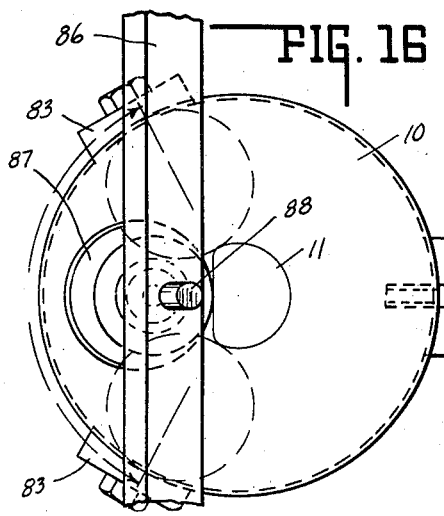

The full nature of the invention will be understood from the accompanying drawings and the following description and claims:

Fig. 1 is a plan view of a lens blank with the inner and outer surfaces rough ground. Fig. 2 is an enlarged section taken on the line 2—2 of Fig. 1. Fig. 3 is the same as Fig. 2, showing a modified form. Fig. 4 is the same as Fig. 1 showing the cam button secured over a portion of the inner field. Fig. 5 is an enlarged section taken on the line 5—5 of Fig. 4. Fig. 6 is a plan view of the finished lens showing the finished non-circular inner field in full lines and the removed portion thereof in dotted lines. Fig. 7 is a plan view of the cam button centering device. Fig. 8 is a section taken on the line 8—8 of Fig. 7. Fig. 9 is an enlarged sectional view of the blank holder and cam controlled grinding button and spindle in operative position. Fig. 10 is a perspective view of the blank mounting and grinding mechanism including the tool shown in Fig. 9. Fig. 11 is a perspective view with portions broken away showing the blank mounting and curvature indicating instrument. Fig. 12 is a plan view of the blank showing the ground-away portion of the inner field during the first operation and of the grinding tool shown in Fig. 9. Fig. 13 is the same as Fig. 12 showing the removed portion of the inner field after the second or final grinding operation. Fig. 14 is a plan view of the blank with its supporting spindle and polishing buttons mounted thereon. Fig. 15 is a section taken on the line 15—15 of Fig. 14 with one of the buttons and the spindle shown in elevation. Fig. 16 is the same as Fig. 14 showing a modified form of polishing button application. Fig. 17 is a plan view of the blank after the grinding operation and the polishing operation by the tool shown in Fig. 16. Fig. 18 is a perspective view of the mechanism for oscillating the spindle in connection with the polishing button shown in Fig. 16.

In the drawings, there is illustrated a full uncut lens blank 10 upon which there has been roughly ground a distance vision field A and a centrally ground and finished concentric inner near vision field B.

In the manner hereinafter described, a cam button 11 is secured to a portion of the field B, as illustrated in Figs. 4 and 5, said button having a tool-engaging cam surface 12 spaced above the surface of the blank and secured thereto by an inset block portion 13. The cam surface 12 is of the shape desired for the finished segment of the lens which comprises the inner near vision field. In the manner hereinafter described, a grinding tool, followed by a polishing tool, is applied to the exposed surface of the blank for grinding and polishing said surface to produce a one-piece bifocal lens having a non-circular near vision field B, as shown in Fig. 6.

In this operation, that portion of the blank indicated by dotted lines in Fig. 5 is ground and polished away to provide the finished distance vision field A', leaving a shoulder 14 and a merged arcuate boundary line 15 between the fields of the finished lens, the shoulder portion 14 being substantially flat and located at approximately the optical center of the two fields for minimizing the image jump therebetween.

As previously stated, the problem here involved, and to which this invention is directed, lies in the complete elimination of any vestige of the original boundary line indicated at 16, while simultaneously effecting the smooth merging of the fields along the arcuate boundary line indicated at 15.

For securing the cam button to the lens, it is provided with a substantially centrally positioned orifice 17 extending therethrough, through which a cementing shellac is introduced when the cam has been accurately positioned. For positioning the cam, reference is made to Figs. 7 and 8 illustrating the cam setting tool. After the cam has been set by said tool and the shellac poured in place, the tool with the blank is placed in a suitable furnace and heated so that the shellac passing from the orifice 17 between the adjacent surfaces of the cam button and lens, will be hardened in place to firmly cement it.

The cam setting tool comprises an annular holder 20 having a peripheral seat 21 upon which the blank 10 is placed. Vertically movable arms 22 are mounted for vertical adjustment upon the wall of the holder and locked by the wing nuts 23 so that each arm may be moved vertically with respect to the holder and locked in adjusted position.

Slidably mounted on each arm there is a block 24 having a ball and socket connection 25 with a cam positioning head 26, the head being held in extended position with respect to the block under tension of a spring 27. Said positioning head, through the block, is adjustable radially of the blank and longitudinally of its supporting arm 22 by an adjusting screw 28 having threaded engagement with the block 24 and rotatably supported by a bearing 29 extending longitudinally of the arm 22. Said screw 28 has secured thereon for adjusting purposes a thumb nut 30.

Upon the blank being mounted in the holder 20, the operator, by means of a magnifier and proper illumination, adjusts the heads 26 to a position so that their blank engaging edges accurately lie tangentially with three segments of the boundary line 16 about the inner field B, as shown in Fig. 7. The operator then selects a cam button 12 of the proper size to snugly fit between the three positioning buttons 26. Since in grinding the field B, there may be some slight variation in diameter, the operator is provided with several buttons 12 of slight variation in size, selecting the button which most closely fits within the positioned heads 26.

With the button 12 so positioned, and while snugly nesting between the heads 26, the shellac is poured into the aperture 17 and the entire cam locating tool is placed in the furnace to effect the hardening of the shellac to firmly secure the cam to the blank for the following grinding and polishing operations.

The method and apparatus for grinding away the portion of field B to be removed, is illustrated in Figs. 9 and 10. Referring to Fig. 9, there is provided a lens holder 35 having a handle 36 in which there are provided three inwardly and radially extending lens-supporting buttons 37 spaced equally about the holder. The lens blank 10 is supported within the holder 35 by engagement of its concave surface with the buttons 37 adjacent its periphery, being secured thereon by applying an annular locking ring 38 over the upper surface thereof and within the holder 35.

Said holder 35 is provided with a concave annular bearing surface 39 seated upon a supporting ring 40 to permit a sliding universal movement by the operator through manipulating the holder by the handle 36. Said supporting ring 40 is secured by the ears 41 to a rotatable collar 42 having an indicator flange 43 which may be rotated with respect to a table 44 and the graduated markings in the ring 45 on said table. Said collar 42 may be locked in adjusted position by a set screw 46.

Extending vertically upward through the table 44 and secured thereto by suitable screw threads, there is provided a barrel 47 with which the supporting ring 40 has threaded engagement at 48. The ring 40 is also provided with a suitable bearing for said barrel indicated at 49. Rotation of the collar 42 with respect to the graduated indications on the ring 45 will cause relative rotation between said collar 42 and barrel 47. Through the threads 48, such rotation will raise or lower the supporting ring 40 with the blank holder and blank with respect to said barrel 47. Thus, the barrel 47 remains fixed, whereas the holder 35 may be slightly adjusted longitudinally thereof by rotation of said collar 42.

Extending at an angle through the barrel 47 there is a spindle bearing 50 in which the spindle 51 is rotatably mounted. Said bearing 50 carries at its upper end an annular nose 52 which is frustro-conical in shape with its periphery angled to provide a flat surface bearing against the cam button 12 for guiding and limiting the relative movement between the lens blank and a small grind stone 53 secured to the end of the spindle 51.

The parts above described are so arranged that the center of curvature of the concave surface through the field A of the lens blank and the bearing surface 39 of the holder 35 lies in the axis of rotation of the spindle 51. The spindle 51 is rapidly rotated through any suitable driving means, not shown, at a predetermined speed as indicated by the speedometer 55. The speed of rotation of spindle 51 is preferably maintained at approximately 15,000 R. P. M. It will be noted that the peripheral shape of the grind stone 53 is such that its grinding surface is of greater diameter than the opposite surface with its periphery angled to comprise a projection of the peripheral surface of the nose 52. Thus, the grinding edge will engage and grind away a portion of the inner field within its boundary line conforming to the shape of the flattened portion of the cam button 12. The diameter of said grind stone 53 is such as to span the portion of the inner field B to be removed, at its greatest width so that the near edge of the stone will extend to the boundary line 14 and the far edge thereof will slightly overlap the boundary line 16. (See Figs. 4, 5 and 6.)

From the foregoing description of the grinding tool it may be noted that after the blank is properly mounted in the holder 35, the collar 42 is turned to position the blank in respect to the grind stone to give the desired depth of cut. This may be gauged by the relative position of the indicator flange 43 to the markings on the ring 45. The depth of cut thus determined by the setting of the blank relative to the grind stone is determined in a manner hereinafter described. Thereupon, the grind stone 53 is rapidly rotated by the spindle 51, while the holder 35 is manually given a circular movement through manipulating the handle 36, for moving the blank relative to the grind stone while maintaining the nose 52 in engagement with the cam surface 12 of the button 11.

Such relative movement is extended about an arc sufficient to permit the grind stone to operate throughout the width of the field B to be ground away as exposed by the cam button. The extent of such movement of the holder and blank may be readily observed by the operator by reason of the transparency of the blank through which he can see the cam button and grind stone, as indicated in Fig. 10. The first cut has the effect of removing a portion of the surface as indicated by the shaded portion C in Fig. 12.

The blank is then placed by the holder upon the indicator shown in Fig. 10 to be hereinafter described and the measurement taken to determine the proper depth for the next cut. Thereupon, the collar 42 is rotatably adjusted and the next cut is taken, which removes an additional area to the extent of that indicated in shaded portion D in Fig. 13. This leaves a slight remaining ridge indicated at E in Fig. 13, which ridge will be eventually removed by the polishing operation.

As illustrated in Fig. 11, the holder 35 with the lens blank 10 mounted therein, is lifted from the supporting ring 40 and seated upon a corresponding ring 60 which is provided with an apertured base 61 through which an indicator gauge 62 having a surface engaging plunger 63 extends. Said gauge is mounted within a housing 64 which contains a source of illumination 65 and a vertically positioned magnifying lens 66 removably mounted in a rack 67. Extending at an angle in front of the lens 66 within said housing there is provided a mirror 68 above which there is an aperture 69. The variation in the relative elevations of the ground away portion C and the surface A may be thus indicated in order to determine the proper adjustment to secure the required depth of cut for the next operation.

Further, as shown in Fig. 10, the table 44 supporting the grinding tool has conveniently arranged thereon a weighted cap 70 in the form of a ring adapted to seat on the locking ring 38, which ring has upwardly extending arms connected with a lever 71 to which a handle 72 is secured for moving the cap 70 in and out of blank holding position.

For gaging the position of the grind stone 53 when it is necessary to remove it from the spindle 51 for reconditioning, there is provided an arm 75 pivotally mounted upon a supporting block 76, which carries a gauge member 77 adapted to be swung into engagement with the grind stone 53 before it is removed to locate its position for accurate replacement.

Table 44 and housing 64 are supported upon a bench 80 having a back panel 81 in which the speedometer 55 is mounted, as well as a switch control panel 82.

Summarizing the above, the blank with the fields A and B is produced in the usual manner, as shown in Figs. 1 and 2, or as illustrated in the modified form of Fig. 3, whereupon the cam button 11 is located in position, as illustrated in Figs. 7 and 8, and cemented to the blank. The blank is then placed in the grinding tool, as shown in Figs. 9 and 10. The blank is set with respect to the grind stone 53, to remove the first cut shown in Fig. 11, by adjusting the position of the holder 35 through rotation of a collar 42 until the mark on its flange is opposite a designated indicating mark 45. The collar is then set by the set screw 46, and the switch on the panel 82 is operated to cause the grind stone to rotate at a predetermined speed indicated by the speedometer 55. The operator then grasps the handle 36 and oscillates the holder 35 on the ring 40 so that the grind stone takes one cut through that portion of the surfaces A and B to be ground away. After taking the cut, the entire holder 35 is lifted off of the ring 40 and placed upon the ring 60, as shown in Fig. 11. Variations of depth between the ground portion and outer field is then observed through the instrument 62 to determine the proper extent of the next cut. In accordance therewith the collar 42 is again adjusted through observing the relative positions of the flange 43 and indicating marks 45, and the lens holder 35 is then replaced on the ring 40 and a second cut is taken to the extent indicated in Fig. 13. The blank is then ready for the polishing operation.

The polishing operation performs the function of further reducing the distance vision field A so that it merges with the near vision field B about the boundary line 15 and also remove the slight shoulder remaining after the grinding operation, as indicated in Fig. 13.

The polishing tool is shown in Figs. 14 and 15. For this operation, the blank is removed from the holder 35 and is seated in a holder 80a having a neck 81a locked upon a spindle 82a which is motor driven in the direction indicated by the arrow. The holder 80a is provided about its periphery with clamping fingers 83 carrying clamping screws 84. Mounted to one side of the holder 80a there is a bar 85 upon which the arms 86 are supported for universal movement, said arms extending over the blank and holder, one on each side of the cam button 11. Each arm is provided with a polishing button 87 lying in engagement with the surface of the blank and confined in its movement by a pivot pin 88 extending downwardly from the arm 86 into a suitable recess in the polishing button. A suitable weight on the arm 86 gives the button sufficient bearing upon the blank for the polishing operation, while the loose but confining connection between the button and the arm through the pin 88 permits the button to freely move with respect to the surface of the blank and conform thereto, as well as to the cam surface 12 of the button 11. The inwardly sloping surface of the lens is sufficient to cause the polishing buttons to maintain contact with the cam button and be guided thereby to engage and polish the exposed adjacent surface as the blank is rapidly rotated.

Upon completion of this polishing operation, the ground away portion of the field B, as shown in Fig. 13, is finally extended so as to merge with the field A, resulting in the finished lens blank from which is cut the completed lens shown in Fig. 6.

In the modified form shown in Fig. 3, the blank is first ground to provide the fields A and B, but a narrow dividing band is left between the fields, as indicated at 116. This is for the reason that one of the most difficult operations is that of exactly setting the polishing button to the boundary line. In order to take as much skill out of the operation as possible and thus reduce the cost of manufacturing, the fitting of the grinding and polishing button used to produce the outer field exactly true to the boundary line is not attempted. In fact, the button is purposely set about a millimeter away from the line, leaving the band 116.

The near vision field B is polished with a button which comes right up to the line, and as it is polished, a minute amount of glass is rolled away, which leaves this field or segment depressed with respect to the surrounding field A. With the polishing button operating upon the field A, it is worn down somewhat, leaving the band 116 slightly raised with respect to both fields, as illustrated in Fig. 3. The polishing time and the weights on the polishing buttons are so regulated that the field B is polished a little deeper than the field A. However, in the final polishing and finishing operation referred to in respect to Figs. 14 and 15, the slight band 116 is eventually removed so that the final results, as above described, are ultimately obtained. The method and apparatus employed in respect to the modified form of Fig. 3 are in all respects the same as above described, being directed merely to a saving in time and greater accuracy.

After the polishing is completed, as above described, the cam button is removed from the blank by placing it in an oven and heating it to about 700° Fahrenheit. This temperature burns up most of the shellac and the cam falls off. The remaining more or less charred shellac may be then washed off the surface of the lens and any scum removed with a treatment of hydrochloric acid. The lens, as shown in Fig. 6, is then cut from the blank, the convex side thereof being ultimately ground according to the particular prescription desired.

A modified method and apparatus for effecting a preliminary step in the polishing and finishing operation, and preliminary to that shown and described with respect to Figs. 14 and 15, is illustrated in Figs. 16, 17 and 18. It will be understood that in connection with the first described method and apparatus, the ground portion of the inner field is left with a slight elevation, as shown in Fig. 13, to be finally removed in the polishing operation. As it is polished down to merge with the outer field A, the remaining portion of the outer field is similarly worn down by such polishing operation, as described with respect to Figs. 14 and 15. Thus, when the ground away portion of the inner field has been sufficiently polished so that it merges indistinguishably into the outer field, the remaining portion of the outer field should be similarly worn down so that it merges indistinguishably and without any shoulder whatever with the inner field along the circular portion of their boundary line. Geometrical considerations show that the ground portion cannot be polished away so that it in effect disappears without the whole remaining surface of the outer field being likewise worn down. But this remaining surface must be worn down only sufficiently to merge along the circular portion of the boundary line. These two results can be accomplished theoretically just at the same time, but in practice this is difficult, since it is not always possible to stop this polishing operation exactly at the proper time to bring about both desired results. There will be minor variations and irregularities in the curvature so that the merging may be obtained on the circular portion of the line before the ground portion has completely disappeared. Under these conditions, the polishing must then be continued and by the time the ground portion has been eliminated, the remaining outer surface will have been worn down a little too far and, therefore, be relatively depressed with respect to the inner field, leaving it standing up microscopically, with a slight shoulder along the circular portion of the line. While this may be very slight, it is objectionable.

To overcome the problem above mentioned, it may be desirable to effect a preliminary polishing operation before the final operation above described with respect to Figs. 14 and 15. For this purpose, after the lens has passed through the grinding operation, as shown in Fig. 13, and has been placed on the polishing holder 80a, said holder is first placed upon a spindle 182 (Fig. 18) instead of the spindle 82a, as shown in Fig. 14. Spindle 182 is caused to oscillate instead of rotate through the medium of the driving motor 90 driving a crank 91 which reciprocates a bar 92 pivotally connected with a reciprocating driving rod 93 which oscillates the spindle 182 through the driving mechanism 94.

As shown in Fig. 16, there is only one polishing button 87 employed which is positioned on the ground side of the blank. The blank 10 is then caused to oscillate to the extent indicated by the arrow so that the button 87 is caused to traverse the ground away portion of the blank between the extreme positions indicated by dotted lines. This results in a polishing operation covering only that portion of the outer field indicated at 95 in Fig. 17, leaving very slight and hardly perceptible ridges 96.

After the operation resulting in the finishing of the blank indicated in Fig. 17, it is then placed in its holder on spindle 82a and the final polishing operations of Figs. 14 and 15 are proceeded with until the remaining portion of the outer field is polished down to merge with the inner field about the circular portion of the boundary line. During this final polishing to effect such a merger of the surfaces, the slight demarcation 96 will have been removed. Thus, instead of attempting to simultaneously do the two jobs, i. e., complete removal of the ground portion and the remaining portion of the outer field, they are done in two steps. This eliminates any danger of over polishing the outer field with the resultant slight shoulder along the circular boundary line. In practice, it is found that the demarcations 96 are rather quickly eliminated and a uniform curve is produced over the entire outer field of the lens in a short time with comparatively little polishing during this final operation.

The invention claimed is:

1. In an apparatus for producing a one-piece multifocal lens blank and lens having an outer vision field and a circular inner vision field, a cam button secured to said blank over a portion of the inner field, said button being formed with an inset lower portion of reduced area and an upper cam portion spaced from the blank, and a tool applied to said blank adapted to engage and be guided by said cam portion for developing that portion of the inner field exposed thereby to merge with the outer field.

2. In an apparatus for producing a one-piece multifocal lens blank, a tool engaging and guiding cam button secured to said blank, said button being formed with an overhanging extended cam portion spaced from the surface of said blank, an intermediate inset portion in engagement therewith, and an aperture extending through said button in communication with the engaging surfaces of the button and blank for receiving a medium adapted to cement said surfaces together.

3. A cam button adapted to be secured to a one-piece multifocal lens blank, comprising an extended cam portion, and an inset blank engaging block portion of lesser area with its periphery spaced inwardly from the periphery of the cam portion.

4. A cam button adapted to be secured to a one-piece multifocal lens blank, comprising a securing block portion adapted to be cemented to the surface of said blank, and a cam portion of greater area overlying the block portion with its cam surface extending beyond the periphery thereof and in spaced relation to the surface of the blank.

5. In an apparatus for producing a one-piece multifocal lens blank and lens having an outer vision field and an inner vision field, a blank holder provided with an arcuate bearing surface of the same center of curvature as said outer field when positioned therein, a supporting ring upon which said bearing surface is slidably mounted to permit movement of said holder and blank about its center of curvature, a grinding tool, and means for rotating said grinding tool about an axis extending through said center of curvature to engage and grind the surface of the blank as it is moved relative thereto.

6. In an apparatus for producing a one-piece multifocal lens blank and lens having an outer vision field and an inner vision field, a blank holder having an arcuate bearing surface of the same center of curvature as said outer field when positioned therein, a supporting ring upon which said bearing surface is slidably mounted to permit movement of said blank about its center of curvature, a grinding tool, means for rotating said grinding tool about an axis extending through said center of curvature for engaging and grinding said blank as it is moved relative thereto, and means for controlling the relative movement between said blank and tool for limiting the extent of the ground surface.

7. In an apparatus for producing a one-piece multifocal lens blank and lens having an outer vision field and a circular inner vision field, a cam button secured to said blank over a portion of the inner field, a blank holder having an arcuate bearing surface of the same center of curvature as said outer field when positioned therein, a supporting ring upon which said bearing surface is slidably mounted to permit movement of said blank about its center of curvature, a grinding tool having a cam engaging portion, means for rotating said grinding tool about an axis extending through said center of curvature, and adjustable means for axially moving said grinding tool and supporting ring relative to each other to grind the surface of the blank to a predetermined depth.

8. In an apparatus for producing a one-piece multifocal lens blank and lens having an outer field and an inner field of different curvature, a blank holder having an annular ring-like bearing surface formed with the curvature of the said outer field, a series of inwardly extending blank supporting buttons secured within said holder upon which the concave surface of said blank is adapted to rest, an annular locking ring supported upon the convex surface of said blank for holding it upon said supporting buttons, a ring-like support engageable by the bearing surface of the holder arranged to permit oscillatory movement thereof during a grinding operation, and a handle extending from said holder positioned to be manually grasped for imparting said oscillatory movement upon the ring-like support while permitting said holder and blank to be readily removed therefrom.

9. In an apparatus for producing a one-piece multifocal lens blank and lens having an outer field and an inner field of different curvature, a blank holder having an annular ring-like bearing surface formed with the curvature of the said outer field, a series of inwardly extending blank supporting buttons secured within said holder upon which the concave surface of said blank is adapted to rest, an annular locking ring supported upon the convex surface of said blank for holding it upon said supporting buttons, a ring-like support engageable by the bearing surface of the holder arranged to permit oscillatory movement thereof during a grinding operation, and a handle extending from said holder positioned to be manually grasped for imparting said oscillatory movement upon the ring-like support while permitting said holder and blank to be readily removed therefrom, and a weighted cap movable into and out of engagement with said locking ring for retaining said holder in its bearing surface engagement under pressure.

FRANK E. DUCKWALL.